(12) United States Patent
Perelman et al.

(10) Patent No.: US 8,676,814 B2
(45) Date of Patent: Mar. 18, 2014

(54) AUTOMATIC FACE ANNOTATION OF IMAGES CONTAINED IN MEDIA CONTENT

(75) Inventors: Dmitri Perelman, Haifa (IL); Edward Bortnikov, Haifa (IL); Ronny Lempel, Zichron Yaakov (IL); Roman Sandler, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/398,678

(22) Filed: Feb. 16, 2012

(65) Prior Publication Data

US 2013/0218858 A1    Aug. 22, 2013

(51) Int. Cl.
    *G06F 7/00* (2006.01)
(52) U.S. Cl.
    USPC .......................................................... 707/748
(58) Field of Classification Search
    USPC .......................................................... 707/748
    See application file for complete search history.

(56) References Cited

U.S. PATENT DOCUMENTS

2008/0130960 A1* 6/2008 Yagnik .......................... 382/118
2012/0158700 A1* 6/2012 Dodson et al. ................ 707/722

* cited by examiner

*Primary Examiner* — Ajith Jacob
(74) *Attorney, Agent, or Firm* — Hickman Palermo Truong Becker Bingham Wong LLP

(57) ABSTRACT

Face-containing images within web pages are automatically annotated to identify the people having those faces. The annotation is based on faces detected in the images and named entities detected in text associated with the images. Each candidate named entity may be scored by the prominence of the named entity in the text relative to the other extracted named entities. Queries are sent to a search engine based on the extracted candidate named entities. Sample images are returned. Face similarity calculations may be computed based on the featured faces and sample faces detected in the search engine-returned sample images to associate a probability score between each featured face and each candidate named entity. A bipartite matching instance may be solved to arrive at a maximum likelihood assignment of named entities to featured faces.

24 Claims, 4 Drawing Sheets

AUTOMATIC FACE ANNOTATION OF IMAGES CONTAINED IN MEDIA CONTENT

FIELD OF THE INVENTION

The present invention generally relates to image annotation, and, more specifically, to assigning functional labels to faces detected in images found on media web pages.

BACKGROUND

Numerous web pages on the Internet today are designed to convey information pertaining to news stories covering a variety of topics ranging from current events to celebrity news. The web pages displaying these news stories often follow a similar format that may be found across a number of different topics, languages, and content producers. A media web page presenting a news story or other informational content frequently contains one or more centerpiece images that are accompanied by text that may relate to the images and the persons and other content depicted in the images.

The images included in media web pages are typically embedded in the web page and arranged in relation to the accompanying text. The web page may include image caption text that is particularly related to and describes the images. For example, if an image on a web page depicts a particular person, caption text placed immediately below the image may identify the person in the image along with other contextual information. Other text, often including at least an article title and the main content of the article, may be placed in other locations surrounding the images on the web page.

The images and text found on a media web page often include elements that are presented as hyperlinks to other content. For example, one or more words in the text of a story may be presented on the web page as a hyperlink that references other content related to the hyperlinked text. Similarly, the images found on a web page may also be presented as hyperlinks to other content related to subject matter depicted in the images. An entire image may serve as a hyperlink or alternatively an image map may specify bounded areas of the image to serve as hyperlinks. The hyperlinking of elements of media web pages to additional content provides a way to increase user interactivity with the web page and creates opportunities to increase user engagement and page views, leading to increased monetization opportunities for providers hosting the media web pages. For example, a portion of an image on a media web page depicting a particular person may be hyperlinked to another web page that displays news stories or other information about that person, increasing the amount of content with which a user may interact when viewing the media web page.

However, the process of manually determining the identity of persons whose faces are depicted in the images found on media web pages and annotating the images with hyperlinks or other metadata for each depicted person is a time-consuming task for web page developers. Such a task would be alleviated with automation. One approach for programmatically identifying faces in images uses pre-established, pre-learned databases containing sample images of persons who might be found in the images in question. However, this approach only works well whenever the set of persons to be detected in the images is known beforehand so that a relevant set of sample images may be collected and stored in the database. In addition, significant time and resources are required in order to collect and maintain a database of sample images for use in identifying a number of different individuals that may be found in the images.

What is needed is an approach for automatically determining the identity of persons detected in images found on media web pages and annotating the images accordingly. More specifically, such an approach that also overcomes the challenges described above is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
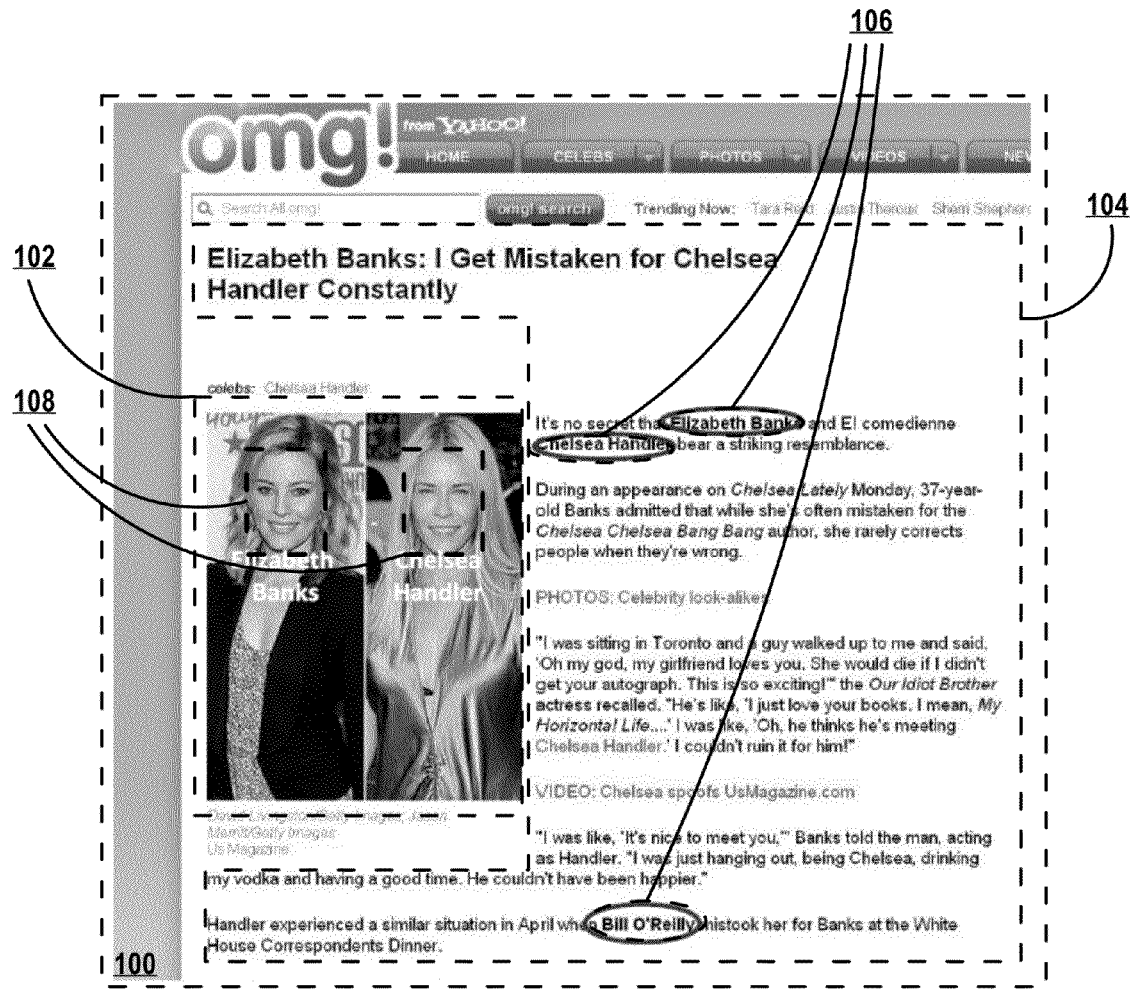
FIG. 1 illustrates an example media web page that includes multiple images and accompanying text.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, apparatus, and computer-readable medium are provided for annotating images based on (1) faces detected in the images and (2) named entities detected in text associated with the images. In an embodiment, one or more featured faces are detected in one or more images found on a web page. Candidate named entities are detected and extracted from text associated with the one or more images. A candidate named entity represents a name that may correctly identify one or more of the featured faces. In one embodiment, each candidate named entity extracted from the text is scored by the prominence of the named entity in the text relative to the other extracted named entities.

In an embodiment, for each candidate named entity, one or more queries based on each candidate named entity are sent to a search engine. In response to the queries, the search engine returns results that include one or more sample images that the search engine deems to be relevant to each query. Each of the sample images returned for each particular candidate named entity may or may not depict the corresponding candidate named entity. A probability score is calculated for pairings of each featured face and each candidate named entity. In an embodiment, the probability score for a particular featured face and a particular candidate named entity pair is based on face similarity calculations computed based on (1) the particular featured face and (2) sample faces detected in the sample images returned by the search engine for the particular candidate named entity.

In an embodiment, further adjustments are made to the probability scores based on the candidate named entity scores. A bipartite matching instance is solved to arrive at a maximum likelihood assignment mapping named entities to featured faces. In another embodiment, post-processing steps assign a confidence score to each candidate named entity to featured face mapping assignment and discard candidate named entity to featured face mappings that fall below a specified confidence score threshold. In an embodiment, the candidate named entity to featured face mappings are used to annotate automatically one or more of the featured faces with hyperlinks or other metadata referencing content associated with the particular named entity assigned to each of the one or more featured faces.

Furthermore, the approaches described herein are designed to mitigate and overcome various sources of noise in order to arrive at a more accurate process for annotating faces contained in images on a media web page. One source of noise may arise from imperfections in the process of detecting the faces in the images. Face detection algorithms may incorrectly detect faces in image portions that do not include a face, or the lines demarcating the portion of an image detected as containing a face may be misaligned. The process of extracting named entities from the text on a web page associated with the one or more images may suffer from similar imperfections. For example, text that does not represent a named entity may be incorrectly detected as a named entity. Each of these sources of noise is mitigated by filtering and scoring mechanisms further described herein.

Approaches described herein aim to overcome other obstacles as well. As an example of such an obstacle, the process of retrieving sample images from a search engine for each candidate named entity may not always result in images ideally suited for face recognition and face similarity scoring processes. The images returned by a search engine may be too small, be of insufficient quality, or otherwise may be unsuitably formatted for consumption by face recognition algorithms. Even more problematic, some images returned by a search engine for a particular query might not contain a depiction of the candidate named entity upon which the query is based at all, but instead may depict persons or other content merely associated with the named entity. Additional filtering and similarity scoring mechanisms further described herein are employed to overcome these sources of noise in order to improve the accuracy of a process for identifying and annotating faces in images on a media web page.

Furthermore, the approaches described herein are capable of operating without the need to maintain a large database of images against which to search. The ability to operate in an ad hoc manner utilizing search engines to retrieve sample images reduces the time and resources needed to implement a system of identifying and annotating faces in images on a media page. This ability simultaneously allows for a more flexible and adaptable system to accommodate the changing nature of the content appearing on media web pages.

System Overview

FIG. 1 illustrates an example media web page that may be processed by the methods and approaches described herein. Media web page 100 is illustrated as including an image and text associated with the image. A portion of media web page 100 contains the image 102 which is embedded within the web page. The image is composed of two separate images, each depicting an individual person. The image 102 further contains image areas 108 that more particularly depict the face of each person depicted in the image.

In addition to image 102, media web page 100 includes multiple sections of text accompanying the images. Text section 104 includes an article title and additional text representing the content of the article. The content text of an article typically includes information related to a particular news story or other informational content and is typically related to any associated images, such as image 102.

Text section 104 further includes multiple portions of text that are displayed as hyperlinks. For example, each of the words 106 in text section 104 are displayed as hyperlinks represented by the names of three persons referenced in the content of the article. Each hyperlink may serve as a reference to additional content related to the subject of the hyperlinked text. The additional content may include other web pages or any other information viewable by a user browsing the media web page. Image 102 illustrates an additional web page element that may serve as a hyperlink. Alternatively, only portions of image 102, such as, for example, bounded image areas 108, may serve as hyperlinks. A single image may contain one or more hyperlinked image areas.

Featured Face Detection

Figure 2:
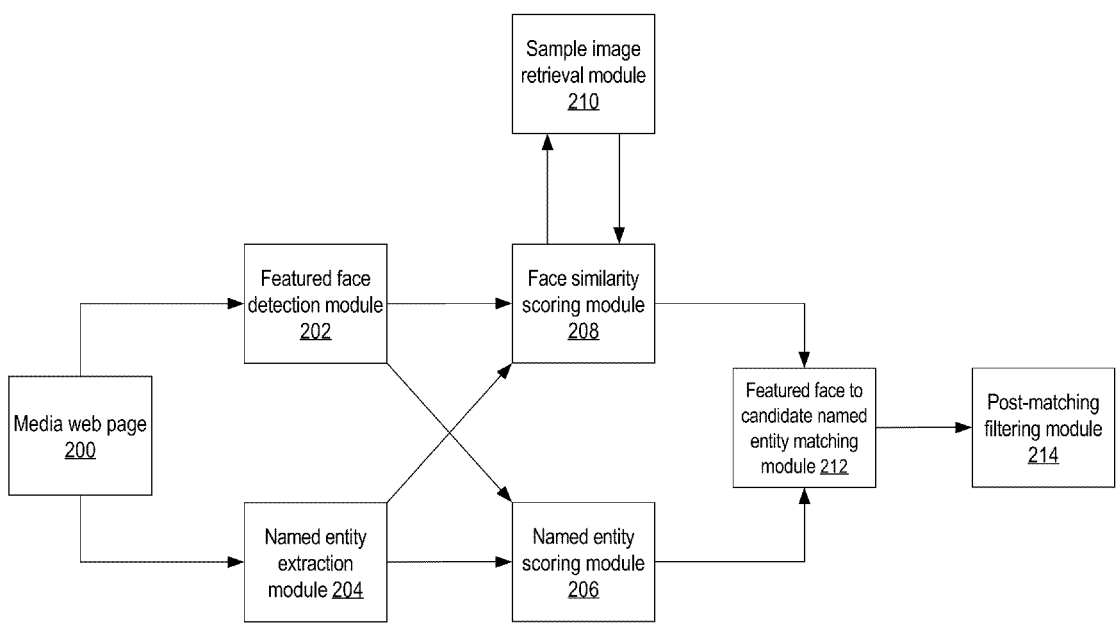
FIG. 2 illustrates a block diagram showing steps involved in annotating images based on (1) faces detected in images on a media web page and (2) candidate named entities detected in text associated with the images in one embodiment of the invention.

FIG. 2 illustrates a flow diagram for a technique that annotates faces detected in images on a media page, according to an embodiment of the invention. The flow diagram begins with a media web page 200 that serves as input to a featured face detection module 202 and a named entity extraction module 204.

In an embodiment, featured face detection module 202 detects and collects a set of featured faces depicted in one or more images found on a media web page. The featured faces may be detected by a face detection algorithm that indicates particular regions of the images that include a face within the boundaries of the indicated regions. In an embodiment, an implementation of a face detection algorithm such as, for example, the Viola-Jones object detection framework may be used to detect featured faces in the images. In an embodiment, face detection module 202 receives as input images found on a web page. Face detection module 202 returns one or more image regions detected as containing a face.

Referring to media web page 100, for example, face detection module 202 might detect the presence of faces in face image areas 108 found in image 102. For purposes of example, image 102 found on media web page 100 contains two faces. However, depending on a particular web page, image face detection module 202 may detect any number of featured faces in any number of images found on the web page. Furthermore, the images may be presented in any number of layouts and configurations, and not otherwise limited to the example layout illustrated on media web page 100.

In an embodiment, face detection module 202 may detect multiple faces in images found on a media web page but only collect featured faces meeting certain filtering criteria. For example, face detection module 202 may collect only detected faces that are at least a specified minimum size (e.g., 50×50 pixels). Face detection module 202 might exclude from the collected set of detected featured face images any image regions detected as containing a face that are less than the specified size. The specification of a minimum face image region size may help to provide higher quality featured face images for use in subsequent processing steps. After face detection module 202 has analyzed the one or more images and applied any filtering criteria, a collected set of featured faces is available for subsequent processing steps.

Named Entity Extraction and Scoring

In an embodiment, named entity extraction module 204 detects and extracts named entities from text associated with one or more featured images. A named entity is typically represented in the text of a media web page by some form of a person's given name, such as, for example, a person's first and last name. However, a named entity may be represented in the text in any number of ways, such as, for example, by a person's first name only, last name only, or a nickname or other alias; names of named entities are not limited to a first and last name. The process of extracting named entities from the text of the media web page by named entity extraction module 204 may be performed before, after, or concurrently with the face detection processes performed by face detection module 202.

In one embodiment, named entity extraction module 204 extracts named entities from the text by parsing the text and detecting particular textual characteristics generally associated with named entities. For example, named entity extraction module 204 may detect that two words appearing next to each other in a certain position of a sentence structure each begin with a capitalized letter, often indicating that the words are a person's name. A variety of shallow parsing techniques or other more complex natural language processing techniques may be used to detect potential named entities in the text.

In an embodiment, named entity extraction module 204 matches potential named entities detected in the text against entries in a dictionary or taxonomy in order to filter the detected named entities. A dictionary or taxonomy may be used to validate detected named entities against known named entities or to exclude detected named entities known not to correspond to a named entity of interest. For example, the name of a city or business may be detected as a named entity, but may not be detected in a dictionary of known named entities and thus not included in subsequent processing steps.

In an embodiment, named entity extraction module 204 searches all text associated with the one or more images on a web page, or only certain sections of the text such as the title and body of an article, for named entities. In another embodiment, named entity extraction module 204 includes other text associated with but not displayed on a web page in the named entity search. Examples of such additional text include a Uniform Resource Locator (URL), markup text such as HyperText Markup Language (HTML), or other text associated with the structure of the web page.

Additionally, in an embodiment, named entity scoring module 206 assigns a relevance score to the extracted named entities. In one embodiment, a relevance score is assigned to a particular named entity is based on one or more factors relating to the particular named entity's presence in the text. For example, the relevance score may be based on the frequency with which the particular named entity appears in the associated text or the order in which the particular named entity appears in the text relative to other detected named entities.

In another embodiment, a relevance score may further be based on formatting information associated with the named entity's appearance in the text. For example, a relevance score may be based on the particular section of text in which the named entity appears (e.g., article title text, body text, or image caption text) or the formatting of the text (e.g., bold font, hyperlinked text, text size, etc.). In another embodiment, a relevance score for a particular named entity may be based on any combination and weighting of the factors described above or other similar factors.

For example, a named entity X that appears more times in the analyzed text than a named entity Y appears in that text may be assigned a higher relevance score than named entity Y. Similarly, a named entity X that appears the same number of times as a named entity Y may be assigned a higher relevance score because named entity X appears first in the order of the text. Named entity scoring module 206 may use any combination and weighting of these and other similar factors to assign the relevance scores to each extracted named entity. In another embodiment, the relevance scores may be based at least in part on the number of faces detected by featured face detection module 202.

In one embodiment, it is assumed that the frequency and relative order in which a particular named entity appears in the associated text are independent random variables. The relevance score of a particular named entity c may then be based on a value corresponding to the probability that the particular named entity c correctly identifies one of the detected featured faces based on a product of the two conditional probabilities P(c|R==r) and P(c|T==t), where T corresponds to the named entity c's frequency of occurrence in the text and R corresponds to the relative order of occurrence of the name entity c in the text. In an embodiment, the conditional probabilities may be modeled by the sigmoid distributions:

$$P(c \mid R == r) = \frac{1}{1 + e^{-2(r-1.5|F|)}},$$

and $$P(c \mid T == t) = \frac{1}{1 + e^{-2(r-1.5T)}},$$

where F is the number of detected feature faces and T is the average frequency of named entity occurrences in the text. The distribution parameters described above may not be optimal for all content types and may be modified to suit particular applications.

Referring to example media web page 100, for example, named entity extraction module 204 may extract named entities from at least text section 104. A parsing of the text found in text section 104 may result in detection of the candidate named entities represented by text 106 corresponding to the names Elizabeth Banks, Chelsea Handler, and Bill O'Reilly. Named entity extraction module 204 is unaware as to whether any of the extracted named entities actually identify any of the persons detected in image 102.

Named entity extraction module 204 may then match the extracted named entities against a dictionary or taxonomy of names in order to determine whether to include or exclude particular detected names. For example, the named entity "Elizabeth Banks" may be found in a dictionary of known names and thus be included by named entity extraction module 204 in a collected set of candidate named entities. The candidate named entities may then be scored based on their relative frequency and order of appearance in the text. For example, the named entity Elizabeth Banks may be scored higher than the named entity Bill O'Reilly because the named entity Elizabeth Banks appears more frequently in the text and also because the named entity Elizabeth Banks appears sequentially before the first occurrence of the named entity Bill O'Reilly.

Face Similarity Scoring

In one embodiment, after a set of featured faces have been detected by face detection module 202 and a set of candidate named entities have been collected by named entity extraction module 204, face similarity scoring module 208 performs a pair-wise similarity scoring procedure for all possible pairings of featured faces and named entities. In one embodiment, face similarity scoring module 208 returns, for each candidate named entity and featured face image pair, a probabilistic value representing the probability that a particular candidate named entity and a particular featured face image are correctly associated, or in other words, the probability that the particular named entity correctly identifies the particular featured face.

Figure 3:
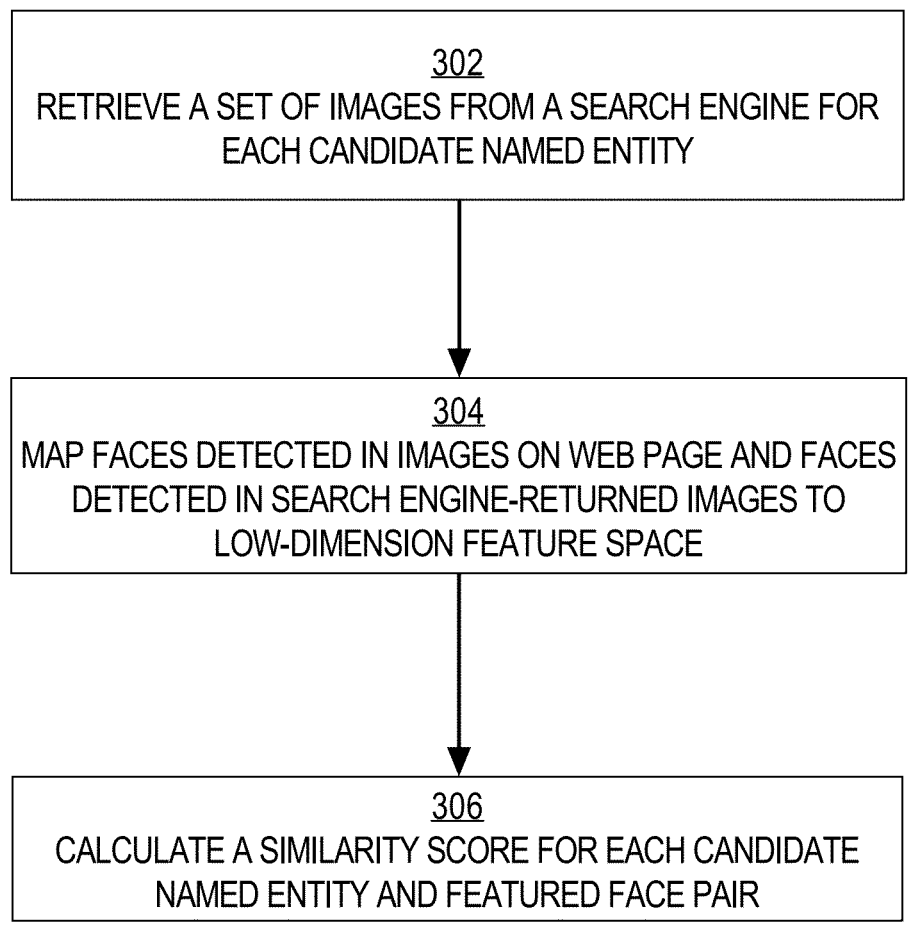
FIG. 3 illustrates a flow diagram showing steps involved in calculating a similarity score between (1) the faces detected in images on a media web page and (2) the candidate named entities detected in text associated with the images in one embodiment of the invention.

FIG. 3 depicts an example technique for calculating the pair-wise similarity scores for each featured face and named entity pair. In block 302, for each candidate named entity, sample image retrieval module 210 retrieves a set of images from a search engine, referred to herein as sample images. In block 304, face similarity scoring module 208 maps face images detected in the sample images from the search engine and the featured face images detected in the web page images to a low-dimension feature space using a face recognition algorithm. In block 306, for each candidate named entity and featured face pair, face similarity scoring module 208 calculates a similarity score based on a computed similarity for the mapped face images. Each of these steps is further described herein.

Sample Image Retrieval

In one embodiment, sample image retrieval module 210 may utilize a search engine to retrieve a set of sample images associated with each particular named entity. In an embodiment, the search engine may be a general-purpose search engine that returns images intermixed with textual or results of other format types in response to a search query. In another embodiment, the search engine may be an image search engine that is designed particularly for the task of returning relevant images associated with a particular search query.

In one embodiment, for each candidate named entity, a query based on that candidate named entity is submitted to a search engine. In an embodiment, for each such query, the search engine may return search results that include one or more images that the search engine deems to be relevant to the query. The image results returned by the search engine may include images having various data formats, image sizes, image qualities, and data sizes.

In an embodiment, the images returned by the search engine may be filtered in order to obtain images better suited for use in the subsequent processing steps. For example, images whose dimensions fail to satisfy a minimum threshold image size, images whose image qualities fail to satisfy a minimum threshold image quality, and/or images whose data sizes fail to satisfy a minimum threshold data size may be excluded as being too small or of insufficient quality for the purposes of later processing steps. The image quality of a search engine-returned image may be determined based on the image's resolution or any other similar image characteristics.

In addition to filtering search engine-returned images based on the image size or quality of the image files, in another embodiment, sample image retrieval module 210 may filter the search engine-returned images based in part on the characteristics of faces detected in the images. In an embodiment, one or more of the returned image results may be processed by a face detection algorithm similar to that used by face detection module 202 to detect faces in the featured images. The results of the application of the face detection analysis on the sample images returned by the search engine may enable further filtering similar to the filtering performed by face detection module 202. For example, in one embodiment, only images that include a detected face contained in an image region that is greater than a specified size may be collected. In another embodiment, images that include more than one detected face may be filtered from the result set in order to reduce the amount of noise resulting from extraneous faces being included in the sample image set. In an embodiment, the returned results are iteratively filtered using one or more of the above criteria until a specified number of sample images meeting all of the filtering criteria are collected.

For example, in reference to the extracted named entities Elizabeth Banks, Chelsea Handler, and Bill O'Reilly from media web page 100, a query may be submitted to a search engine for each named entity. For named entity Elizabeth Banks, for example, a query merely consisting of the query string "Elizabeth Banks" may be submitted to the search engine. In other embodiments, additional query parameters and terms may be included in the query string in an effort to better focus the search engine results. In response to the query string sent for named entity Elizabeth Banks, a search engine returns results that include one or more images associated with the query terms. These results may be filtered using one or more of the filtering mechanisms described above in order to arrive at a collection of sample images for each candidate named entity.

Feature Space Mapping

In an embodiment, the collected face images in both the featured images and the search engine-returned images undergo one or more pre-processing steps. In one embodiment, the face images may undergo one or more of the steps of bounding box alignment, scaling of the images to a uniform set of rectangular dimensions, transformation of the images to grayscale, and intensity histogram equalization.

After the images undergo any pre-processing steps, in one embodiment, a machine vision algorithm maps each face image to a high dimensional feature space. Example embodiments of machine vision algorithms that may be employed to map the face images to a particular feature space include the Three Patch—Local Binary Pattern (TP-LBP) algorithm, the Eigenfaces technique, and the Earth Moving Distance (EMD) algorithm. Mapping the face images to a high dimensional feature space enables a more accurate similarity comparison between any two faces images.

Similarity Computation

After the face images are mapped to a feature space, in one embodiment, face similarity scoring module 208 computes a similarity score for each featured face and candidate named entity pair. In an embodiment, the similarity between a featured face and a candidate named entity is represented as the probability of a multi-label classifier associating the featured face with the candidate named entity. Example embodiments of classifiers employed to calculate the probability include k-nearest neighbor (kNN) and multi-class support vector machine (MC-SVM).

In an embodiment, a multi-label classifier takes as input (1) the face images detected in the featured images and (2) the sample images that have been mapped to a feature space. The multi-label classifier utilizes a distance calculation between each particular featured face image and sample image faces for a particular candidate named entity to arrive at a calculated similarity score for each particular featured face and candidate named entity pair. For example, a k-nearest neighbor classifier may define a similarity score between a particular featured face f and particular candidate named entity c pair as $S(f, c) \sim e^{-D(f,c)}$, where $D(f, c)$ is a distance function for the featured face f and the sample face image set for particular candidate named entity c. In one embodiment, $D(f, c)$ is defined as the average $L_2$ distance in the feature space between featured face f and candidate named entity c's k closest samples.

In an embodiment, similarity scoring results in an n×m matrix of similarity scores, where n represents a number of detected featured faces and m represents a number of collected candidate named entities. Depending on the particular media web page, there may be more candidate named entities than featured faces, or vice versa. Each cell in the n×m similarity score matrix corresponds to the calculated similarity score for a particular candidate named entity and particular featured face pair corresponding to the cell's row and column. A matrix of scores is used for illustration purposes only, and any data structure may be used to store the resulting similarity scores.

Feature Face to Candidate Named Entity Matching

Once a similarity score has been calculated for each featured face and candidate named entity pair, in one embodiment, featured face to candidate named entity matching module 212 establishes a mapping between each featured face and a single candidate named entity. In an embodiment, the mapping is computed as a maximum-likelihood estimation problem, maximizing the probability that is most highly probably of all possible assignments of candidate named entities to featured faces based on the computed similarity scores. For example, an embodiment may employ the Hungarian combinatorial optimization algorithm to analyze a matrix such as the one produced by face similarity scoring module 208 in order to produce a maximum-likelihood assignment for featured face to candidate named entity pairs based on the calculated similarity scores.

In an embodiment, the mapping assignments may be based partially on the named entity scores computed by named entity scoring module 206. In this way, the named entities receiving the highest entity scoring values are more likely to be assigned to a face and, conversely, named entities receiving low entity scoring values are less likely to be assigned to a face.

Post-Matching Filtering

After an initial featured face to candidate named entity mapping assignment is established, in an embodiment, post-matching filtering module 214 performs one or more post-matching processing steps to further improve the accuracy of the matching and to reduce the likelihood of incorrect mappings. In one embodiment, post-matching filtering module 214 processes each featured face against a selection of one or more arbitrary named entities known to not match any of the detected featured faces in order. Post-matching filtering module 214 determines for each of the featured faces, whether a particular featured face is calculated to be more similar to any of the arbitrary named entities than the named entity of the assigned mapping for the particular named entity. In an embodiment, if a particular featured face is calculated to be equally or more similar to an arbitrarily selected named entity than the candidate named entity assigned by featured face to candidate named entity matching module 212, the mapping is canceled. In order to reduce the computing resources required for each mapping, in an embodiment, the images associated with the arbitrarily selected named entities may be pre-processed in a manner similar to the face detection process described in featured face detection module 202.

In one embodiment, further filtering may be performed based on a specified threshold similarity score for featured face and candidate named entity pairs. For example, as a result of determining that a featured face and candidate named entity pair does not exhibit a similarity score greater than a specified threshold, the association between the particular featured face and candidate named entity may be removed. A minimum threshold level of certainty may be adjusted in order to arrive at a desired level of certainty that faces will not be incorrectly labeled.

Example Implementations

The embodiments disclosed herein may be implemented in a variety of scenarios. In one embodiment, the face annotation processes may be applied to media web pages hosted by a web server. The face annotation may be applied to a media web page by a web server hosting the media web page or another networked device prior to serving the media web page to a user. In this embodiment, a web browser requesting and receiving the media web page will detect the face annotation code applied to the web page when it is received and rendered for display in a browser.

In another embodiment, the approaches described herein may be implemented on a client machine. For example, a client-side browser add-on may implement the approaches described herein in order to supplement web pages served to the client machine without face annotation. A web page without face annotation may be received by a client machine requesting the web page and the processing steps may be performed on the client machine in order to annotate the web page before rendering the web page in the browser.

Furthermore, the faces identified in the media web page images may be annotated in a variety of ways. In one embodiment, the image regions corresponding to the identified faces may be transformed into hyperlinks referencing other content either internal or external to the web page. In another embodiment, the image regions may be enabled to display dynamic content when a user interacts with the image region on the web page. In another embodiment, the images may be statically annotated by overlaying textual or other information directly on the media web page.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
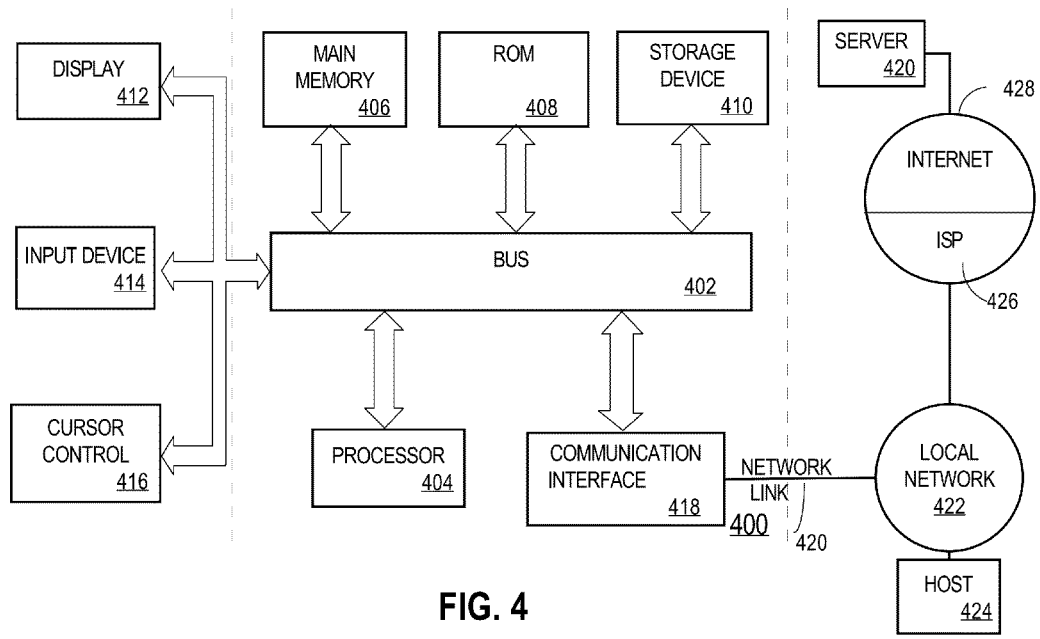
FIG. 4 is a block diagram that illustrates a computer system upon which an embodiment described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    detecting one or more faces in one or more first digital images;
    identifying one or more named entities contained in text of a document that is associated with the one or more first digital images;
    for each particular named entity of the one or more named entities:
        sending, to a search engine, a query based on the particular named entity; and
        receiving, from the search engine, in response to execution of the query by the search engine, one or more second digital images;
    calculating a plurality of scores, wherein the plurality of scores includes a single score for each pairing of a set of pairings, wherein the set of pairings includes a pairing between each face of the one or more faces detected in the one or more first digital images and each named entity of the one or more named entities;
    wherein each score of the plurality of scores indicates a similarity between a particular face of the one or more faces and the one or more second digital images received from the search engine in response to execution of a query based on a particular named entity of the one or more named entities;
    storing, in a non-transitory storage medium, a mapping, based at least in part on the plurality of scores, between (1) each face of a subset of the faces detected in the one or more first digital images and (2) a particular named entity of the one or more named entities; and
    wherein the method is performed by one or more special-purpose computing devices.

2. The method of claim 1, wherein the detecting one or more faces in one or more first digital images further comprises filtering the faces based on an image region size threshold associated with image regions detected as containing a face in the one or more first digital images.

3. The method of claim 1, further comprising:
    for each particular named entity of the one or more named entities, calculating a relevance score associated with the particular named entity based on one or more of: a frequency of occurrence of the particular named entity in the text, a relative order in which the particular named entity appears in the text, and formatting information associated with the named entity in the text.

4. The method of claim 3, wherein each score of the plurality of scores is based at least in part on a relevance score.

5. The method of claim 1, wherein the text of the document that is associated with the one or more first digital images includes one or more of: text displayed on a web page containing the one or more first digital images, a Uniform Resource Locator (URL), and markup language associated with the web page.

6. The method of claim 1, wherein the identifying one or more named entities further comprises filtering the named entities based on determining whether one or more of the named entities are included in a dictionary or a taxonomy.

7. The method of claim 1, wherein receiving the one or more second digital images from the search engine further comprises filtering the one or more second digital images based on one or more of: image size, image quality, and image data size.

8. The method of claim 1, further comprising:
    detecting one or more sample faces in the one or more second digital images;
    filtering the one or more second digital images based on one or more of[M]: images containing two or more sample faces, detected sample face image region size, image size, image quality, and image data size.

9. The method of claim 8, wherein each score of the plurality of scores is generated based on a multi-label classifier that takes as input the faces detected in the first digital images and sample faces detected in the second digital images.

10. The method of claim 1, further comprisingmodifying the mapping based on one or more post-filtering processes.

11. The method of claim 1, further comprising:
    for a particular face of the one or more faces detected in the one or more first digital images, calculating a second score for an arbitrary named entity that is not contained in the text of the document;
    based on the second score, modifying a particular mapping between the particular face and a particular named entity of the one or more named entities.

12. The method of claim 1, wherein the mapping is computed based on the plurality of scores and a maximum likelihood assignment between the one or more faces detected in the one or more first digital images and the one or more named entities.

13. A non-transitory computer-readable storage medium storing one or more sequences of instructions which, when executed by one or more processors, causes the one or more processors to perform:
    detecting one or more faces in one or more first digital images;
    identifying one or more named entities contained in text of a document that is associated with the one or more first digital images;
    for each particular named entity of the one or more named entities:
        sending, to a search engine, a query based on the particular named entity; and
        receiving, from the search engine, in response to execution of the query by the search engine, one or more second digital images;
    calculating a plurality of scores, wherein the plurality of scores includes a single score for each pairing of a set of pairings, wherein the set of pairings includes a pairing between each face of the one or more faces detected in the one or more first digital images and each named entity of the one or more named entities;
    wherein each score of the plurality of scores indicates a similarity between a particular face of the one or more faces and the one or more second digital images received from the search engine in response to execution of a query based on a particular named entity of the one or more named entities;
    storing, in a non-transitory storage medium, a mapping, based at least in part on the plurality of scores, between (1) each face of a subset of the faces detected in the one or more first digital images and (2) a particular named entity of the one or more named entities.

14. The non-transitory computer-readable storage medium of claim 13, wherein the detecting one or more faces in one or more first digital images further comprises filtering the faces based on an image region size threshold associated with image regions detected as containing a face in the one or more first digital images.

15. The non-transitory computer-readable storage medium of claim 13, further comprising:
for each particular named entity of the one or more identified named entities, calculating a relevance score associated with the particular named entity based on one or more of: a frequency of occurrence of the particular named entity in the text, a relative order in which the particular named entity appears in the text, and formatting information associated with the named entity in the text.

16. The non-transitory computer-readable storage medium of claim 15, wherein each score of the plurality of scores is based at least in part on a relevance score.

17. The non-transitory computer-readable storage medium of claim 13, wherein the text of the document that is associated with the one or more first digital images includes one or more of: text displayed on a web page containing the one or more first digital images, a Uniform Resource Locator (URL), and markup language associated with the web page.

18. The non-transitory computer-readable storage medium of claim 13, wherein the identifying one or more named entities further comprises filtering the named entities based on determining whether one or more of the named entities are included in a dictionary or a taxonomy.

19. The non-transitory computer-readable storage medium of claim 13, wherein receiving the one or more second digital images from the search engine further comprises filtering the one or more second digital images based on one or more of: image size, image quality, and image data size.

20. The non-transitory computer-readable storage medium of claim 13, further comprising:
detecting one or more sample faces in the one or more second digital images;
filtering the one or more second digital images based on one or more of: images containing two or more sample faces, detected sample face image region size, image size, image quality, and image data size.

21. The non-transitory computer-readable storage medium of claim 20, wherein each score of the plurality of scores is generated based on a multi-label classifier that takes as input the faces detected in the first digital images and sample faces detected in the second digital images.

22. The non-transitory computer-readable storage medium of claim 13, further comprising modifying the mapping based on one or more post-filtering processes.

23. The non-transitory computer-readable storage medium of claim 22, further comprising:
for a particular face of the one or more faces detected in the one or more first digital images, calculating a second score for an arbitrary named entity that is not contained in the text of the document;
based on the second score, modifying a particular mapping between the particular face and a particular named entity of the one or more named entities.

24. The non-transitory computer-readable storage medium of claim 13, wherein the mapping is computed based on the plurality of scores and a maximum likelihood assignment between the one or more faces detected in the one or more first digital images and the one or more named entities.

* * * * *